United States Patent
Corsi

(10) Patent No.: US 6,491,078 B2
(45) Date of Patent: Dec. 10, 2002

(54) REINFORCED BEAD FOR A RADIAL TIRE

(75) Inventor: Patrick Corsi, Thuret (FR)

(73) Assignee: Compagnie Generale des Establissements Michelin-Michelin & Cie (FR)

( * ) Notice: Subject to any disclaimer, the term of this patent is extended or adjusted under 35 U.S.C. 154(b) by 0 days.

(21) Appl. No.: 09/730,265

(22) Filed: Dec. 5, 2000

(65) Prior Publication Data

US 2001/0000388 A1 Apr. 26, 2001

Related U.S. Application Data

(63) Continuation of application No. PCT/EP99/03606, filed on May 25, 1999.

(30) Foreign Application Priority Data

Jun. 5, 1998 (FR) .............................. 98 07146

(51) Int. Cl.$^7$ .............................................. B60C 15/06
(52) U.S. Cl. ..................... 152/539; 152/543; 152/546; 152/547; 152/552
(58) Field of Search ................. 152/539, 540, 152/541, 542, 543, 546, 547, 548, 552, 554, 555

(56) References Cited

U.S. PATENT DOCUMENTS

| | | | |
|---|---|---|---|
| 3,095,027 A | | 6/1963 | Weber |
| 4,185,677 A | | 1/1980 | Motomura et al. |
| 4,214,620 A | * | 7/1980 | Mezzanotte .................. 152/454 |
| 4,231,409 A | * | 11/1980 | Mezzanotte .................. 152/527 |
| 4,398,584 A | * | 8/1983 | Tansei et al. ................ 152/543 |
| 5,151,140 A | * | 9/1992 | Takagi ......................... 152/543 |
| 5,363,896 A | * | 11/1994 | Kogure et al. ............... 152/543 |

FOREIGN PATENT DOCUMENTS

| | | |
|---|---|---|
| FR | 2385546 | 10/1978 |
| FR | 2435359 | 4/1980 |
| GB | 2035228 | 6/1990 |

OTHER PUBLICATIONS

Japanese Abstract, vol. 011, No. 360 (M–645), Nov. 25, 1987; JP 62 137 207, published Jun. 20, 1987.

Japanese Abstract, vol. 096, No. 001, Jan. 31, 1996; JP 07 232 520, published Sep. 5, 1995.

* cited by examiner

Primary Examiner—Michael W. Ball
Assistant Examiner—Justin Fischer
(74) Attorney, Agent, or Firm—Baker Botts LLP

(57) ABSTRACT

A tire for heavy loads and having beads intended to be mounted on flat rim seats or rim seats which are inclined at 5°, including at least one radial carcass ply formed of inextensible reinforcement elements and anchored in each bead to a bead wire to form an upturn, the end of which is located at a radial distance $H_{RNC}$ from the base of the bead. Each bead is reinforced by at least two additional reinforcement armatures, at least one first armature formed of at least one ply of radial textile reinforcement elements which is located axially to the outside of a second armature formed of at least one ply of inextensible elements forming an angle α with the circumferential direction such that $0° \leq \alpha \leq 45°$.

5 Claims, 1 Drawing Sheet

REINFORCED BEAD FOR A RADIAL TIRE

This is a continuation of PCT/EP99/03606, filed May 25, 1999.

BACKGROUND OF INVENTION

The present invention relates to a tire with radial carcass reinforcement, and more particularly to a "heavy-vehicle" tire, intended to be fitted on vehicles such as lorries, road tractors, buses, trailers and others, and in which a novel reinforcement structure for the beads is adapted to improve the life of said beads.

Generally, a tire of the type in question comprises a carcass reinforcement formed of at least one ply of metal cables, which is anchored in each bead to at least one bead wire, forming an upturn. The carcass reinforcement is radially surmounted by a crown reinforcement, composed of at least two plies of metal cables, crossed from one ply to the next and forming angles of between 10° and 45° with the circumferential direction. The carcass reinforcement upturns are generally reinforced by at least one ply of metal cables oriented at a small angle relative to the circumferential direction.

In the case of the presence of a single bead reinforcement ply, the latter may be located along the carcass reinforcement upturn with a radially upper end located above or below the radially upper end of the carcass reinforcement upturn. As for the radially lower end of such a ply, it is generally located either on a straight line parallel to the axis of rotation and passing approximately through the center of gravity of the meridian section of the anchoring bead wire of the carcass reinforcement, in the case of a tire having beads intended to be mounted on rim seats inclined at 15°±2°, or on a straight line parallel to the axis of rotation and passing through a point located between the center of gravity of the meridian section of the anchoring bead wire and the point of maximum axial width of the carcass reinforcement, in the case of a tire having beads intended to be mounted on rim seats inclined at 0° or at 5°±1°. In this second case, the bead reinforcement ply is then wound around the bead wire, so as to have an axially outer strand and an axially inner strand, the radially upper end of the axially inner strand being generally located beneath the radially upper end of the axially outer strand.

Furthermore, the life of "heavy-vehicle" tires, owing to the progress achieved, and to the fact that certain types of travel are made less of a handicap as far as wear of the tread is concerned, has become such that it is also necessary to improve the life of the beads, and more particularly of tires subject to prolonged travel, this travel frequently inducing a high temperature of the beads owing to the temperatures reached by the mounting rims.

Numerous solutions have been described for improving the life of the beads of tires, whether they are intended to be mounted on 15°-seat rims or flat rims or 5°-seat rims: for example, it has been proposed to replace the metallic reinforcement ply by a plurality of plies of reinforcement elements, textile ones, for example, crossed from one ply to the next and said plies being located axially either on the same side of the upturn or on either side of said upturn, or alternatively partly along the upturn and partly along the carcass reinforcement.

The life of the beads can also be improved by arranging two reinforcement plies along the carcass reinforcement, without reinforcement of the upturn.

From reading French application FR 2 730 190, said improvement can be obtained by the presence in the beads of at least one reinforcement ply formed of circumferential metallic elements, which ply is wound around the bead wire on the outside of the wound part of the carcass reinforcement, such that the radially upper ends respectively of the axially outer strand and of the axially inner strand are radially located above a straight line parallel to the axis of rotation and passing through the point of the bead wire which is farthest from said axis of rotation. The carcass reinforcement, formed of radial cords or cables, is thus formed, at the level of its contact surface with the bead wire, as is known, of substantially circumferential elements which are generally metallic in the form of wound cords, cables, bands or strips, inserted between said elements with substantially circumferential orientation and the additional ply of metallic elements, which are also circumferential. This structure thus makes it possible to take up the tensile stresses to which the carcass reinforcement is subjected, and thus minimizes all the deformations at the ends of the carcass reinforcement upturn, whatever the traveling conditions.

The solution of a bead reinforcement ply with circumferential reinforcement elements does not appear to be the technically and industrially optimal solution for tires having beads intended to be mounted on so-called flat rims or rims having seats inclined at 5°, since the important factor does not seem to be the presence of circumferential elements.

Furthermore, and with the aim of lightening tires for heavy vehicles which are mounted on rims having seats inclined at 0° or 5°±1°, numerous attempts have been made to dispense with the axially inner strand of the reinforcement ply of the bead, and to have substantially the same architecture of carcass reinforcement and reinforcement ply for the two types of rims used.

Although said known solutions, the object of which is to avoid deradialization of the cables of the upturn of the carcass reinforcement and to minimize the radial and circumferential deformations to which the end of said upturn and the radially upper end of the reinforcement ply are subjected, respectively, have improved the life of the bead reinforcements, the performance of the tires mounted on rims having 0° seats or 5°±1° seats is on the other hand reduced by the appearance and propagation of breaks in the outer layer of rubber covering the bead and providing the connection to the rim.

The invention proposes to overcome the above disadvantages.

SUMMARY OF THE INVENTION

In order to improve the life of a tire required to bear heavy loads and having beads intended to be mounted on flat rim seats or rim seats which are inclined at 5°, said tire according to the invention, comprising at least one radial carcass reinforcement, formed of at least one ply of inextensible reinforcement elements and anchored in each bead to a bead wire to form an upturn, the end of which is located at a radial distance $H_{RNC}$ from the base of the bead, each bead being reinforced by at least two additional reinforcement armatures, at least one first armature formed of at least one ply of radial reinforcement elements and at least one second armature formed of at least one ply of inextensible elements forming an angle $\alpha$ with the circumferential direction such that $0°<\alpha<45°$, characterized in that, viewed in meridian section, the first reinforcement armature is formed of radial textile reinforcement elements not wound around the anchoring bead wire of the carcass reinforcement and located axially to the outside of the second reinforcement, the radially inner end of said first reinforcement being located between the two straight lines parallel to the axis of rotation and passing respectively through the points of the anchoring bead wire which are respectively farthest and least far from the axis of rotation, the radially outer end being located at a distance $H_{LE}$ from the base of the bead of between 80% and 120% of the distance $H_{RNC}$, whereas the second armature, which is not wound around said anchoring bead wire, has a radially inner end located between the straight line parallel to the axis of rotation and the base of the bead and a radially outer end at a distance $H_R$ from said base of between 60% and 75% of $H_{RNC}$.

Reinforcement elements will be considered to be radial if the angle which they form with the circumferential direction of the tire lies within a range of 80°–100°.

Likewise, in the spirit of the invention, "radially upper end" of a bead reinforcement armature which may be formed of one or more plies is to be understood to mean the end of the reinforcement ply which is farthest from the axis of rotation, the reinforcement plies possibly having upper ends included in a range of radial distance of at most 20 mm. Likewise, the radially lower end of a bead reinforcement armature will be the lower end of the ply least far from the axis of rotation.

The first armature of radial reinforcement elements is advantageously formed of a single ply of aliphatic polyamide textile cables composed of two plied cords, at least 250/250 twists per meter. It is preferably separated from the second armature by a profiled element of rubber mix of a thickness of at least 2 mm.

The second additional bead reinforcement armature may be formed of at least one ply of circumferential metallic reinforcement elements; in this case, it is advantageous, in order to facilitate manufacture and to reduce the cost thereof, to select as reinforcement elements for said ply lengths or assemblies of lengths of metal cables, of a circumferential length less than the circumferential length of the center axis of the bead wire. It may also be formed, as known per se, of a single ply of metal cables parallel to each other in the ply and forming a small angle of between 5° and 30° with the circumferential direction. In all cases, it is preferably separated from the carcass reinforcement upturn by a profiled element of rubber mix of a thickness of at most 3 mm.

DESCRIPTION OF THE DRAWING

The invention will be better understood with reference to the following description, which refers to the drawing which illustrates an embodiment of the invention in non-limiting manner, and in which the single

DESCRIPTION OF PREFERRED EMBODIMENTS

Figure 1:
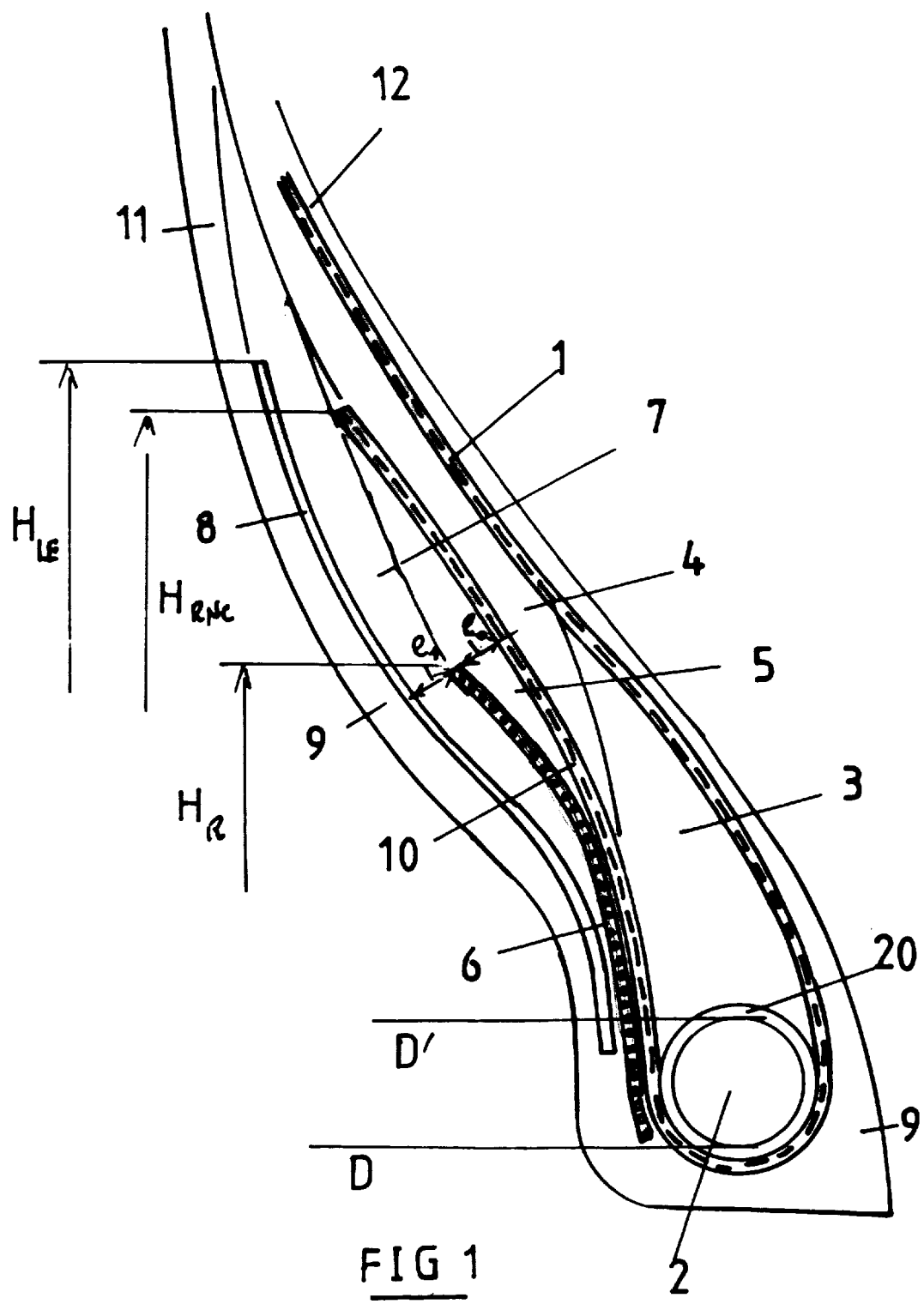
FIG. 1 is a diagram of a bead according to the invention.

The bead shown in FIG. 1 is that of a 10.00.R.20 X tire, intended to be mounted on a rim comprising rim seats inclined at 5°. Said bead is reinforced by a bead wire 2. Around said bead wire 2 there is anchored a carcass reinforcement 1 composed of a single ply of metal cables. The anchoring is effected by an upturn 10 around the layer 20 of rubber mix which covers the bead wire 2, the radial distance $H_{RNC}$ between the radially upper end of said upturn 10 and the base of the bead, said base of the bead being represented by convention by the straight line D parallel to the axis of rotation passing through the point of the bead wire 2 closest to said axis of rotation, being equal, in the example in question of the tire of dimension 10.00.R.20, to 0.25 times the height H of the tire on its rim, the latter being the radial distance between the point of the tire which is radially farthest from the axis of rotation from the straight line for measuring the nominal diameter of the mounting rim, and equal to 270 mm. Between the carcass reinforcement 1 and its upturn 10, radially above the bead wire 2, there is arranged a first bead filler 3 of rubber mix of a generally high Shore A hardness, said first filler 3 being extended radially by a second filler 4 of rubber mix of a lower Shore A hardness than the previous one and the radially upper end of said filler 4 being substantially located at the level of the maximum axial width of the tire.

Axially to the outside of the upturn 10 of the ply 1 there is arranged a second bead reinforcement armature composed, in the example described, of a single ply 6, not turned up about the bead wire 2. The radially upper end of said ply 6 is located relative to the base of the bead at a height $H_R$ equal to 50 mm, the distance $H_R$ being equal to 66% of the distance $H_{RNC}$, the radially inner end being located practically on the straight line parallel to the axis of rotation defining the base of the bead. The ply 6 of said second armature is formed of metal cables oriented at 22° to the circumferential direction. The radially upper half of the ply 6 is axially separated from the upturn 10 of the carcass reinforcement 1 by a profiled element 5 of rubber mix having a Shore A hardness substantially equal to the Shore A hardness of the mixture constituting the filler 4, and the thickness $e_0$ of which, measured perpendicular to the upturn 10 and at the level of the radially upper end of the ply 6, is equal to 3 mm. The two radially outer ends respectively of the upturn 10 of the carcass reinforcement 1 and of the reinforcement ply 6 of the bead are covered axially to the outside by a fourth profiled element or filler 7, referred to as an "infill filler" and bearing on the second bead filler 4, on the profiled element 5 and on part of the upturn 10, and the thickness $e_1$ of which, measured at the level of the radially outer end of the second bead reinforcement armature, is equal to 2 mm.

Axially to the outside of the infill filler 7 and along said filler there is arranged the first bead reinforcement armature, composed of a single ply 8 of 94/2(tex) aliphatic polyamide cables twisted at 485/485 twists per meter. In known manner, such a formulation indicates that each plied thread or cable is formed of two strands (multifilament fibers), each having a linear density of 94 tex before twisting, which are first of all twisted individually at 485 twists per meter in a given direction, then secondly twisted together at 485 twists per meter in the opposite direction. Said cables of the ply 8 are radial and, in the example described, form an angle equal on average to 89°. The radially outer end of the ply 8 is located at a radial distance HLE from the base D of the bead of 80 mm, or 106% of the distance $H_{RNC}$ between the end of the upturn of the carcass ply 1 and said base. As for the radially inner end of said ply 8, it is located practically on the straight line parallel to the axis of rotation of the tire which passes through the center of gravity of the cross-section of the anchoring bead wire 2, and between the straight line D previously defined and the straight line D', parallel to the axis of rotation and passing through the tip of the bead wire 2 farthest from said axis.

The first reinforcement ply 8 isolates from the of the axially outer bead the protective rubber mix 9, which, as is known per se, surrounds the major part of the bead, said mix 9 being axially to the inside extended radially to the outside by the conventional layers of inner rubber reinforcements 12, while axially to the outside it is extended radially to the outside by the sidewall layer 11.

The combined presence, axially to the outside of the upturn 10 of the carcass reinforcement, of a first reinforcement armature 8 of radial textile elements which is not wound around the anchoring bead wire 2 of the radial carcass reinforcement 1 and of a second reinforcement armature 6 which minimizes the deradialization of radial cables of the carcass reinforcement makes it possible not only to reduce substantially the stresses on the rubber mixes forming the bead, more particularly at the ends of plies, but also substantially to delay the appearance of breaks in the protective layer 9, since the tires thus described have covered, in tire endurance travel on tire, a mileage of 85,000 km (average of two results), whereas all the tires without a ply of radial textile cables only covered an average of 32,500 km (average of about ten tires under the same traveling conditions.

I claim:

1. A tire for bearing heavy loads and having beads intended to be mounted on flat rim seats or rim seats which are inclined at 5°, comprising at least one radial carcass reinforcement, formed of at least one ply of inextensible reinforcement elements and anchored in each bead to a bead wire to form an upturn, the end of which is located at a radial distance $H_{RNC}$ from the base of the bead, and at least two additional reinforcement armatures for reinforcing each bead, a first reinforcement armature formed of at least one ply of radial reinforcement elements and a second reinforcement armature formed of at least one ply of inextensible elements forming an angle $\alpha$ with the circumferential direction such that $0° \leq \alpha \leq 45°$, characterized in that, viewed in meridian section, the first reinforcement armature is formed of radial textile reinforcement elements not wound around the anchoring bead wire of the carcass reinforcement and located axially to the outside of the second reinforcement armature, the radially inner end of said first reinforcement armature being located between the two straight lines D and D' parallel to the axis of rotation and passing through the points of the anchoring bead wire which are respectively closest and farthest from the axis of rotation, the radially outer end being located at a distance $H_{LE}$ from the base D of the bead of between 80% and 120% of the distance $H_{RNC}$, whereas the second reinforcement armature, which is not wound around said anchoring bead wire and which is located axially between the first reinforcement armature and the upturn of the carcass reinforcement, has a radially inner end located between a straight line parallel to the axis of rotation passing through the center of gravity of the cross-section of the bead wire and the base D of the bead and a radially outer end at a distance $H_R$ from said base of between 60% and 75% of $H_{RNC}$.

2. A tire according to claim 1, characterized in that the first reinforcement armature of radial reinforcement elements is formed of a single ply of aliphatic polyamide textile cables, composed of two plied cords, at least 250/250 twists per meter.

3. A tire according to claim 1, characterized in that the first reinforcement armature is axially separated from said second reinforcement armature, at the level of the radially outer end of the second reinforcement armature by a profiled element of rubber mix having a thickness $e_1$ of at least 2 mm.

4. A tire according to claim 1, characterized in that the second bead reinforcement armature is formed of a single ply of metal cables parallel to each other in the ply and forming an angle of between 5° and 30° with the circumferential direction.

5. A tire according to claim 1, characterized in that the radially upper half of the second reinforcement armature is axially separated from the upturn of the carcass reinforcement by a profiled element of rubber mix of a thickness $e_0$ of at most 3 mm.

* * * * *